Dec. 4, 1923.
T. F. FERRY
DOWEL FASTENING
Filed April 26, 1922
1,476,501
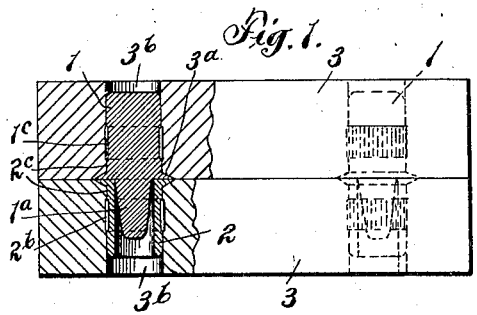
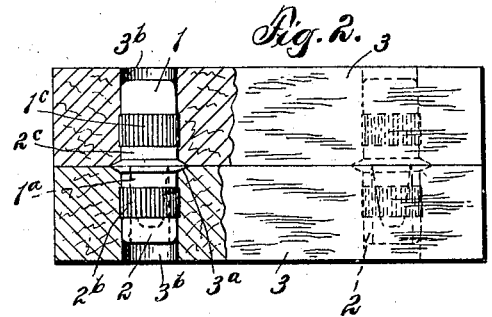
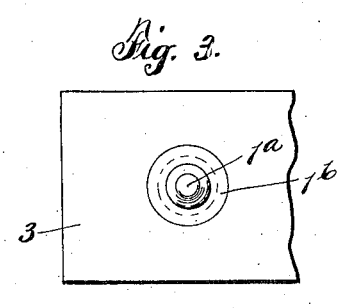
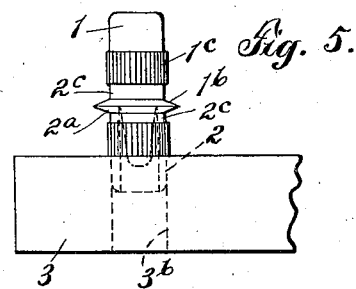
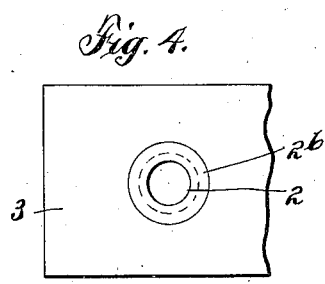
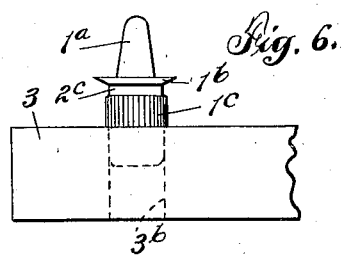
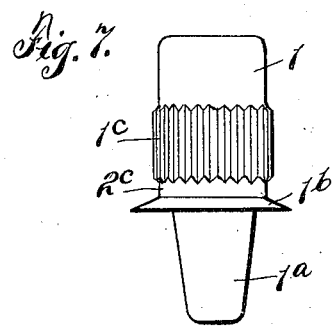
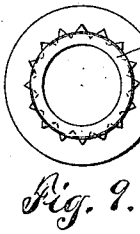
Inventor
Thomas F. Ferry
By
Ged. B. Billman
Attorney Patented Dec. 4, 1923.

1,476,501

UNITED STATES PATENT OFFICE.

THOMAS F. FERRY, OF CLEVELAND, OHIO.

DOWEL FASTENING.

Application filed April 26, 1922. Serial No. 556,580.

*To all whom it may concern:*

Be it known that I, THOMAS F. FERRY, a citizen of the United States, residing at Cleveland, in the county of Cuyahoga and State of Ohio, have invented certain new and useful Improvements in Dowel Fastenings, of which the following is a specification.

My invention relates to improvements in dowel fastenings for use in connecting two adjacent pieces or parts, the present embodiment of the invention being particularly designed and adapted for use in detachably connecting the mating parts or members of a flask or any other article where a dowel joint or connection is desirable.

The invention relates more particularly to the form and arrangement of the dowel elements or members together with improved means for mounting and securing such dowel members on the face sides of the connected parts whereby such parts and the dowel members are held in properly arranged relation to each other.

The invention further relates to improved means of mounting or driving such dowel members into the dowel receiving openings or sockets of the mating faces of the article parts to be connected together with improved means of driving such dowel members therein without injury to the dowel members or adjacent parts and whereby also such dowel members will be properly secured and will be particularly centralized when driven therein.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1 is a plan view, partly in section, of two metallic connected parts equipped with dowel fastening elements constructed in accordance with this invention.

Fig. 2, a similar view of two wooden connected parts equipped with the improved dowel fastening elements constructed in accordance with this invention.

Fig. 3, an end view of a dowel or head member applied to the face side of a part or member to be connected.

Fig. 4, a similar view of the socket or female member so applied.

Fig. 5, a plan view showing the dowel members in assembled relation with the annular stop elements forming mating abutments and illustrating how the head member or dowel pin, proper, may be used for driving in the socket member without injury to the face of the latter.

Fig. 6, a similar view showing the dowel pin, proper, or head member in its initial position preparatory to being driven into the socket opening of the article to which it is to be attached.

Fig. 7, an enlarged side elevation of the head or male member, detached.

Fig. 8, a similar view of the socket or female member, detached.

Fig. 9, a rear elevation of the female or socket member.

Similar numerals of reference designate like parts throughout all the figures of the drawings.

The improved dowel fastening comprises two mating or complementary members consisting of a male or head member 1, (or dowel pin proper) and a female or socket member 2. The male or head member 1 is preferably formed of solid material throughout its body portion and the female or socket member 2 is preferably provided with a body of tubular formation. The male or head member 1 is provided with an outwardly tapering terminal or fin portion $1^a$, as shown.

Each dowel member is provided with stop and anchor elements preferably of the specific construction and relative arrangement hereinafter referred to. The stop elements are preferably formed by means of transversely extending companion or mating abutments $1^b$ and $2^a$, respectively, on the members 1 and 2, said abutments or stop elements $1^b$ and $2^a$ being preferably in the specific form of outwardly and radially tapered flange or fin elements adapted to rest against and be seated within correspondingly bevelled or tapered portions $3^a$, on the face or mating sides of the connected parts 3, and at the terminal portions of the sockets or dowel receiving openings $3^b$, as shown most clearly in Figs. 1 and 2 of the drawings, when the dowel members are fully driven in. It will be seen that when the parts are brought together to form a dowel joint the companion abutments $1^b$ and $2^a$ meet each other and form stop elements on the face sides of the connected parts 3 for properly holding the latter and the dowel members in proper relative position.

As a means of centralizing the dowel members when driven into the openings or sockets 3ᵇ and also of anchoring such members when fully driven in or seated, the exterior portions of the bodies of such members are provided with longitudinally extending knurled elements or corrugations 1ᶜ and 2ᵇ, on the members 1 and 2, respectively, said knurled elements 1ᶜ and 2ᵇ being preferably formed through the medium of a suitable knurling tool from the metal itself so that no additional material is formed in such knurls and whereby also when the members 1 and 2 are driven into the openings or sockets 3ᵇ of metal parts as shown in Fig. 1 of the drawings, the outer projecting edges of such knurls will be stripped off (the knurls also being partially flattened out and restored to their original positions) the stripped off material in such instance being deposited in the annular space or groove portions 2ᶜ, conjointly formed by the abutment stop members 1ᵇ and 2ᵃ and the edges of the knurls 1ᶜ and 2ᵇ such space or groove 2ᶜ forming a convenient receptacle or recess to receive and be filled by such stripped off stock from the knurls as the members 1 and 2 are driven in.

In this connection it will be understood that where the dowel members are to be used in connection with metal parts, as shown in Fig. 1 of the drawings, the bevelled or countersunk portions 3ᵃ, are previously formed by means of a suitable tool for such purpose, before the parts 1 and 2 are driven in, while when used in connection with wooden parts as shown in Fig. 2, such stop abutments will embed themselves into the face sides of the connected parts 3 forming such tapered portions, and in either instance, the members 1 and 2 will be centralized and anchored in the connected parts. In Fig. 2 it will be understood that when the parts 1 and 2 are driven into the openings or sockets 3ᵇ the wood or resilient material will spring back into the space or groove portion 2ᶜ to anchor the parts 1 and 2 through the medium of the knurls or anchor elements 1ᶜ and 2ᵇ.

As a means of driving or seating the female or socket members 2 into the openings or sockets 3ᵇ without injury to the edge or mouth portion of the member 2, the head member 1 is used as a driving or impact member, as shown in Fig. 5 of the drawings, until the member 2 is fully driven in with the abutment stop member flush with the adjacent surfaces of the attached member after which the head member or dowel pin proper may be initially inserted as illustrated in Fig. 6 of the drawings and the member 1 driven in by driving upon the end of the tapered terminal or pin portion 1ᵃ.

Having thus described some of the embodiments of my invention, without having attempted to set forth all of the forms in which it may be made, or all of the modes of its use, what I claim and desire to secure by Letters Patent is,—

1. A dowel fastening, comprising longitudinally milled male and female members.

2. A dowel fastening, comprising longitudinally knurled head and socket members having annular recesses to receive material stripped from said knurls when driven home.

3. In a dowel fastening, dowel pin and socket members having annular stop fins flat on their face sides and tapered on their rear and countersunk in the meeting face sides of the attached article parts.

4. In a dowel fastening, a dowel member having an annular radially tapered stop flange forming an abutment on and extending flush with the meeting faces of the connected article parts.

5. In a dowel fastening, longitudinally knurled head and socket members having transversely extending tapered mating abutments forming stop elements on the face sides of the connected parts.

6. A dowel fastening, comprising longitudinally knurled head and socket members having tapered stop fins to close the marginal edges of the dowel receiving openings of the adjacent article parts.

7. In a dowel fastening, a dowel member having transverse stop and longitudinal anchor fins adapted to be seated on the face and interior portions of the attached article parts, respectively, said stop fins being spaced from said longitudinal anchor fins forming annular recesses to receive stock stripped from said fins when driven.

8. In a dowel fastening, a dowel having radially tapered stop and anchor elements, said stop element being adapted to be seated within the face of the attached article and said anchor elements being longitudinally spaced from said stop element and embedded within such attached article.

9. In a dowel fastening, a dowel having radially extending stop and anchor elements, said stop element consisting of a tapered flange adapted to be countersunk within the face of the attached article, and said anchor elements being spaced from said stop element forming an intervening groove and being embedded within the article attached.

In testimony whereof I have affixed my signature.

THOMAS F. FERRY.